United States Patent
Schwegler (12)

(10) Patent No.: US 6,321,719 B1
(45) Date of Patent: Nov. 27, 2001

(54) PRESSURE DAMPER FOR A PRESSURE VESSEL

(75) Inventor: Helmut Schwegler, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/246,721

(22) Filed: Feb. 9, 1999

(30) Foreign Application Priority Data

Feb. 9, 1998 (DE) .............................................. 198 05 024

(51) Int. Cl.[7] .................................................... F02M 41/00
(52) U.S. Cl. ............................ 123/467; 123/456; 123/468
(58) Field of Search .................................. 123/467, 456, 123/468, 469, 470; 138/26, 30

(56) References Cited

U.S. PATENT DOCUMENTS

| | | | |
|---|---|---|---|
| 4,608,957 | * 9/1986 | Kemmner | 123/467 |
| 4,729,360 | * 3/1988 | Fehrenbach et al. | 123/447 |
| 5,233,963 | * 8/1993 | Gregorius et al. | 123/456 |
| 5,575,262 | * 11/1996 | Rohde | 123/467 |
| 5,579,739 | * 12/1996 | Tuckey et al. | 123/467 |
| 5,617,827 | * 4/1997 | Eshleman et al. | 123/456 |
| 5,845,621 | * 12/1998 | Robinson et al. | 123/456 |
| 5,896,843 | * 4/1999 | Lorraine | 123/467 |

OTHER PUBLICATIONS

Section Through Centerline of Fuel Rail, K3/EVA1, Jun. 26, 1997.

* cited by examiner

*Primary Examiner*—Carl S. Miller
(74) *Attorney, Agent, or Firm*—Ronald E. Greigg

(57) ABSTRACT

The present invention relates to a pressure damper for a pressure vessel, in particular for a fuel distributor for an internal combustion engine, with a damper bellows that is connected to a sealing cap for closing an opening of the pressure vessel. In order to obtain a pressure damper that can be installed as easily as possible and can be manufactured as inexpensively as possible, the provision is made according to the invention that the sealing cap is embodied of one piece as a deep-draw part made of metal.

21 Claims, 3 Drawing Sheets

PRESSURE DAMPER FOR A PRESSURE VESSEL

BACKGROUND OF THE INVENTION

The current invention relates to a pressure damper for a pressure vessel, in particular for a fuel distributor for an internal combustion engine.

PRIOR ART

Known pressure dampers, particularly of the kind that are used in a fuel distributor tube of a fuel injection system, usually contain a damper bellows made of metal, which is affixed in a leakproof manner to a two-part sealing cap. The sealing cap contains a central disk which is inserted with its outer circumference into a support ring that has a radial flange and a cylindrical section with an outer circumference groove for containing a sealing ring. The sealing cap is inserted into a connecting sleeve, which is affixed to an open end of the fuel distributor tube so that the damper bellows is disposed at least partially inside the fuel distributor tube. The sealing cap rests with its cylindrical section against a corresponding inner wall of the connecting sleeve, while its flange is pressed against a corresponding flange section of the connecting sleeve. To this end, a fastening ring is provided, which is inserted between the radial flange of the sealing cap and a flange that extends radially inward on the connecting sleeve.

With this known pressure damper, the sealing cap is relatively expensive to produce and furthermore requires an additional fastening ring for mounting.

OBJECT AND SUMMARY OF THE INVENTION

The pressure damper according to the invention has the advantage over the prior art that it is easier to manufacture since it contains a reduced number of separate parts. In particular, the pressure damper can be produced more easily and less expensively if the sealing cap is manufactured as a deep-draw part made of metal.

It is particularly advantageous if the sealing cap, which is preferably embodied as a deep-draw part, has a cup section, with which it can be inserted into a sleeve section associated with the opening to be closed, and has a radial flange, which adjoins an edge of the cup section remote from the cup bottom and is used to fasten the sealing cap onto the sleeve section. The sleeve section here can be constituted by a corresponding connector on an arbitrary pressure vessel, by the end section of a fuel distributor tube, or by a connecting sleeve that is fastened to the pressure vessel in the vicinity of the opening to be closed. The cup-shaped embodiment of the sealing cap makes it possible to simply embody it as rigid enough to withstand the pressures in the pressure vessel, particularly in the fuel distributor tube of a fuel injection system, without being deformed.

A particularly attachment for securing the sealing cap of the pressure vessel to the sleeve section is produced if the sealing cap rests with its radial flange against a corresponding radial flange on the sleeve section and the two flanges are fastened to each other by means of reshaping. In particular, flanging and caulking can be used as reshaping techniques in this connection. If the two flanges are to be flange-connected to each other, then a corresponding flanging ring can be provided, for example, but it is also possible to provide a corresponding axial rib on the radial flange of the sleeve section or also on the radial flange of the sealing cap, which rib can then be flanged around the respective other flange. In a corresponding manner, a rib can be provided on one flange, protruding axially beyond the respective other flange, and the material of this rib can then be pressed by means of caulking over the respective other rib.

It is particularly advantageous if a radial shoulder is provided on the sealing cap and this shoulder, together with an opposing shoulder embodied on the sleeve section, forms an annular chamber for containing a sealing ring. In addition, it is particularly advantageous if the shoulder is provided on the cup section that can be inserted into the sleeve section. In this manner, not only can a chamber for a sealing ring that is required between the sleeve section and the sealing cap be produced in a particularly simple manner, but also the rigidity of the sealing cap is thus further increased.

It is particularly advantageous if the sleeve section is constituted by a connecting sleeve that is attached to the pressure vessel so that it encompasses the opening of this pressure vessel that is to be closed. The connecting sleeve is thus completely associated with the pressure damper and can then be embodied so that it completely encompasses the damper bellows. In particular, this has the advantage that the entire pressure damper can be completely preassembled, wherein the damper bellows is protected from damage in transport by the connecting sleeve. In particular, this assures that when the pressure damper is being mounted onto the pressure vessel, i.e. for example onto the fuel distributor tube, the damper bellows cannot be damaged through negligence.

Another simplification of the pressure damper according to the invention is produced if the damper bellows is connected to the sealing cap so that its bottom is used as a sealing part of the damper bellows. It is particularly suitable in this connection if the damper bellows is a metal bellows which can then be simply welded to the sealing cap.

On its end remote from the sealing cap, the damper bellows can be closed, for example, by means of a disk, which is manufactured as a turned or stamped part or as a stamped and drawn part. It is particularly advantageous, however, if the damper bellows is a metal bellows that is closed on the end remote from the sealing cap, since the number of components required for the pressure damper can be further reduced in this manner.

The invention will be better understood and further objects and advantages thereof will become more apparent from the ensuing detailed description of preferred embodiments taken in conjunction with the drawings.

BRIEF DESCRIPTION OF THE DRAWINGS

In the various FIGS. of the drawings, components that correspond with one another are provided with the same reference numerals.

DESCRIPTION OF THE PREFERRED EMBODIMENTS

Figure 1:
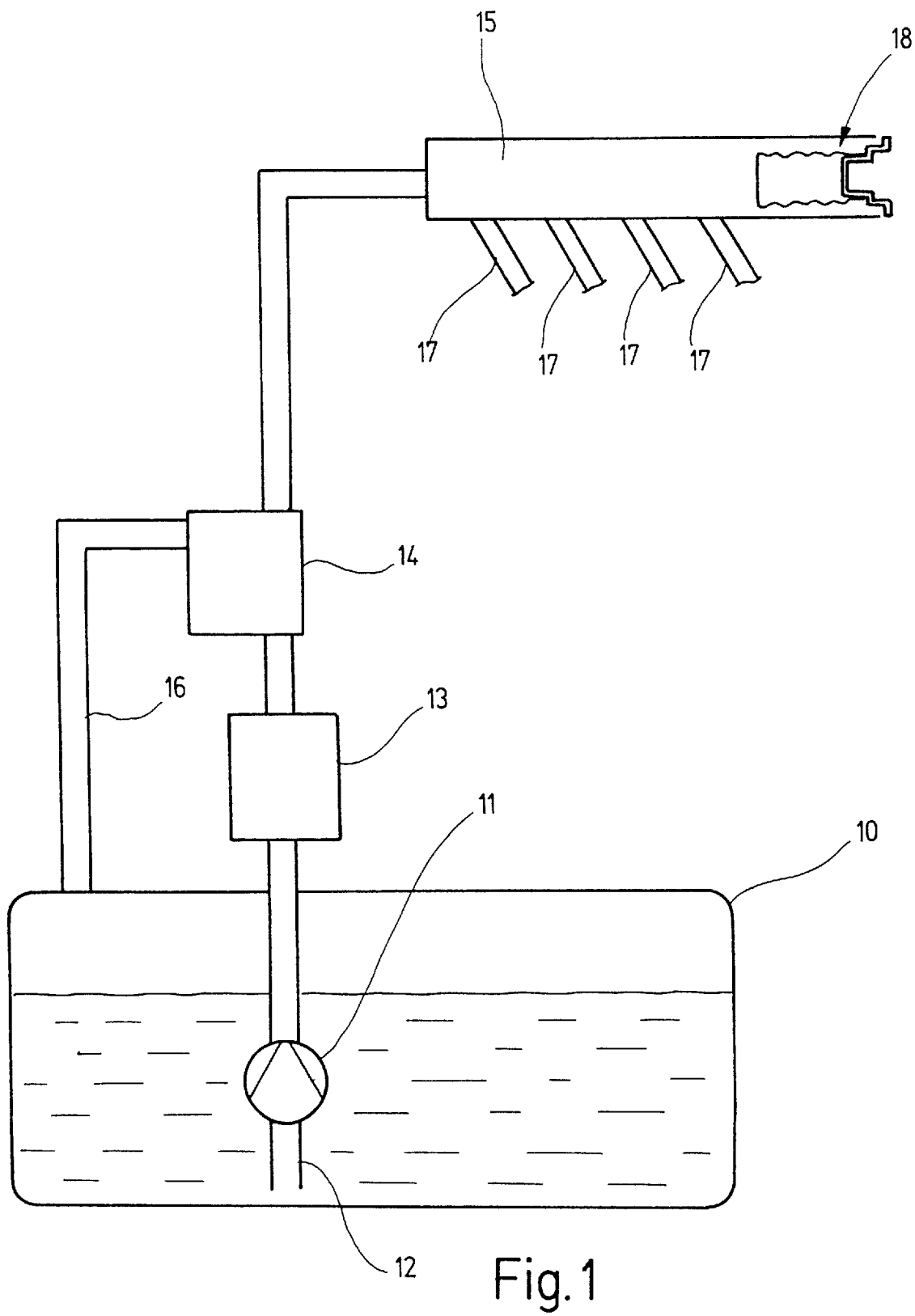
FIG. 1 is a schematically simplified depiction of a fuel injection system.

FIG. 1 shows a fuel injection system with a fuel tank 10, which is associated with a fuel pump 11 that aspirates fuel by way of an intake fitting 12 and pumps the fuel by way of a fuel filter 13 and a pressure regulator 14 to a fuel distributor tube 15. The pressure regulator 14 is connected to the fuel tank 10 by way of a return line 16 so that excess fuel can be returned to the fuel tank 10 for purposes of pressure limitation.

Fuel injection valves 17 are disposed on the fuel distributor tube 15, which is only represented in a purely schematic form, so that high-pressure fuel can be injected by means of the fuel injection valves either into the intake region of the individual cylinders of an internal combustion engine or directly into the combustion chamber of the individual cylinders.

In order to damp and reduce pressure fluctuations in the high-pressure fuel in the fuel distributor tube 15 due to the individual injection events, a pressure damper 18 is provided at one end of the fuel distributor tube 15.

Figure 2:
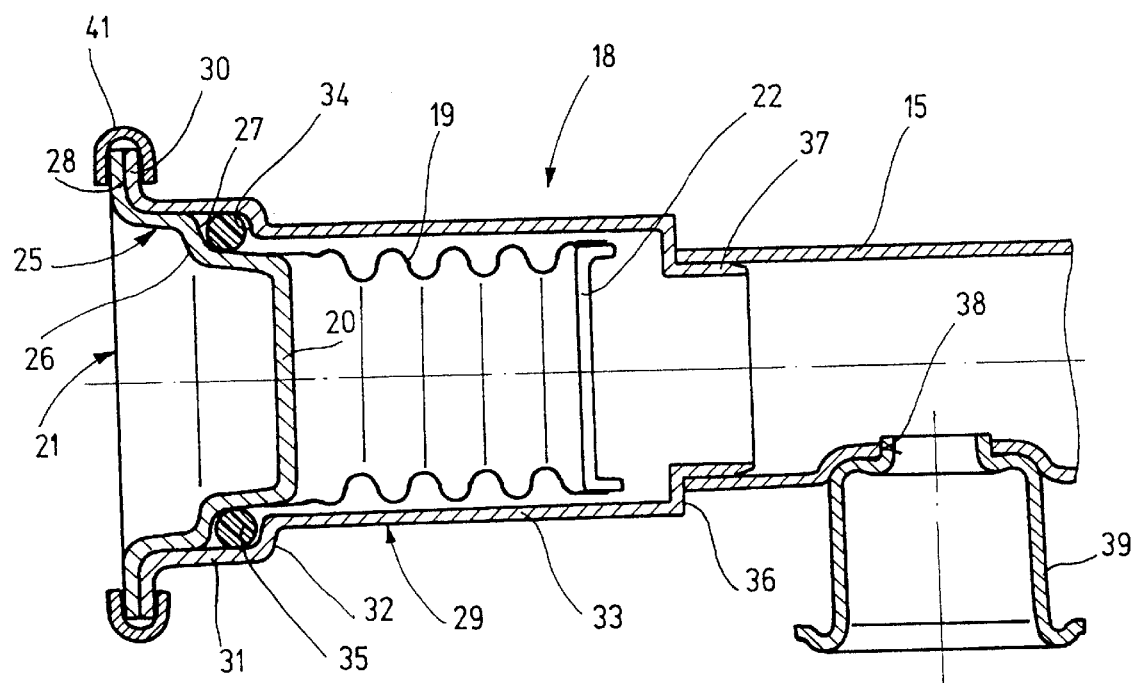
FIG. 2 is a schematic sectional depiction of a pressure damper according to the invention.
Figure 4A:
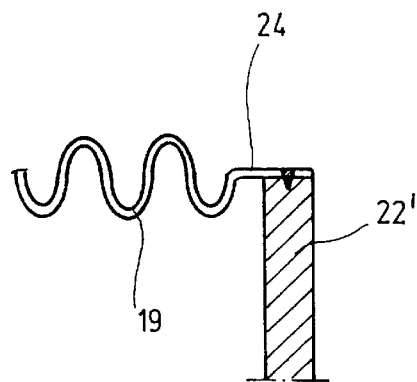
FIGS. 4a to 4c are sectional depictions of the end of a damper bellows remote from the sealing cap, in order to illustrate various embodiments of the damper bellows end.
Figure 4B:
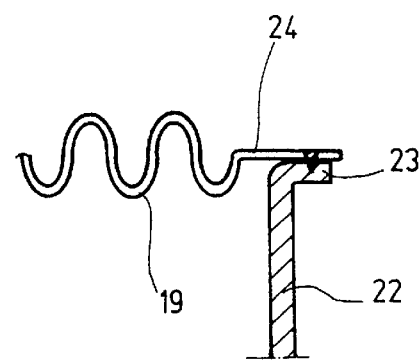

As FIG. 2 shows, the pressure damper 18 including a damper bellows 19, which is connected with one end on the left in FIG. 2 to a bottom 20 of a cup-shaped sealing cap 21. On its end remote from the sealing cap 21, the damper bellows 19 is sealed by a closing disk 22. In addition, the damper bellows 19, which is preferably made of metal, is welded to the circumference edge region of the closing disk 22, as shown with particular clarity in FIG. 4b.

The closing disk 22 can be a stamped and bent part or a stamped and drawn part, which has an axially extending edge 23 for welding to the damper bellows 19. As can be inferred from FIG. 4b, it is also possible to provide a turned part or a simple stamped part as the closing disk 22' and to weld a cylindrical end section 24 to the outer circumference edge of the closing disk 22', FIG. 4a, which in this instance, must have a sufficient thickness.

Figure 4C:
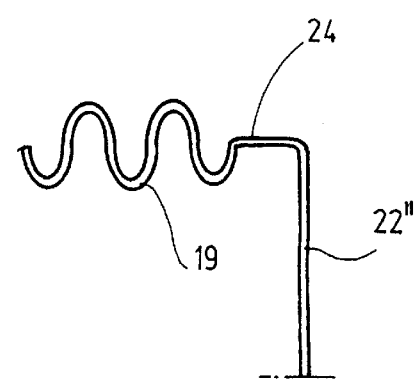

As shown in FIG. 4c, however, the damper bellows 19 can also be embodied with a closed bottom 22", which is connected in one piece to the damper bellows 19 by way of its cylindrical end section 24.

The sealing cap 21 has a cup section 25 with a step 26, which forms a radial shoulder 27, and has a flange 28 that extends radially outward remote from the bottom 20 of the cup section 25. The sealing cap 21 with the damper bellows 19 attached to it is then inserted into a connecting sleeve 29 so that it rests with its radial flange 28 on a corresponding radial flange 30 of the connecting sleeve and is held securely there by means of a flanging ring 41.

Adjoining its radial flange, the connecting sleeve 29 has a first cylindrical section 31 that transitions by way of a first step 32 into a second cylindrical section 33 with a reduced diameter. The first step 32 thereby forms a shoulder 34 that is disposed opposite the shoulder 27 on the cup section 25 of the sealing cap 21 so that a chamber for a sealing ring 35 is formed between the sealing cap 21 and the connecting sleeve 29.

Depending on the dimensions of the damper bellows 19, the connecting sleeve 29, and the pressure vessel, i.e. in the exemplary embodiment depicted, the fuel distributor tube 15, it is possible that the damper bellows 19 extends into the pressure vessel or into the fuel distributor tube 15. In the exemplary embodiment represented, however, preferably the provision is made that the second cylindrical section 33 of the connecting sleeve 29 extends beyond the end of the damper bellows 19 remote from the sealing cap 21 and consequently totally encompasses it. On its end remote from the flange 30 of the connecting sleeve 29, the second cylindrical section 33 transitions by way of a second step 36 into a cylindrical fastening section 37, which is inserted into an open end of the fuel distributor tube 15 and is attached in it securely and in a leakproof fashion. On the other hand, it is also possible to embody the fastening section 37 so that it is slid onto the fuel distributor tube 15.

Openings 38 are provided in the wall of the fuel distributor tube 15, only one of which is shown in FIG. 2, into which fastening sleeves 39 for the fuel injection valves 17 are inserted.

Figure 3A:
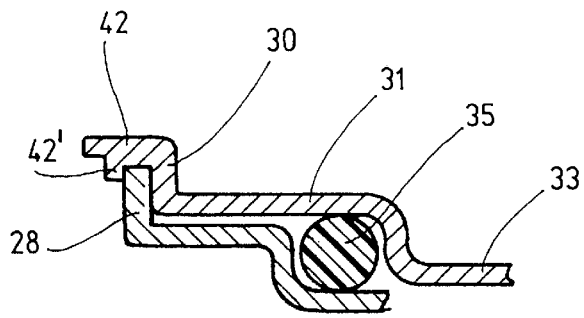
FIGS. 3a to 3c are sectional depictions of a sealing cap in the edge region in order to illustrate various possibilities for fastening to a sleeve section.
Figure 3B:
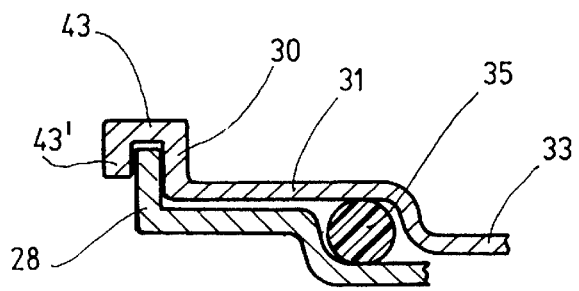
Figure 3C:
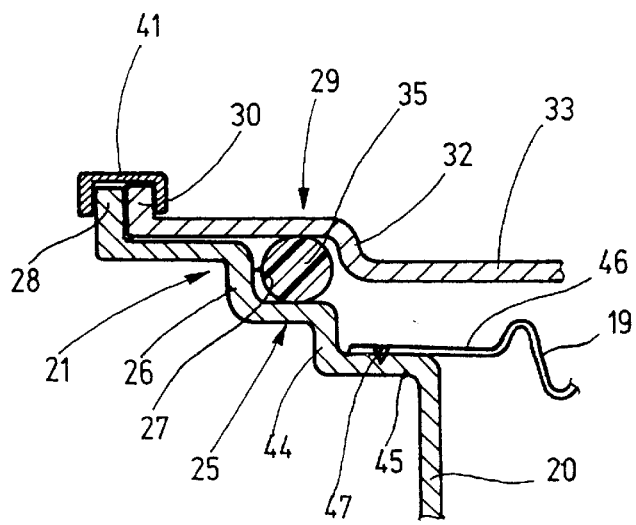

The fastening of the sealing cap 21 shown in FIG. 2 by a joint flanging-over of its radial flange 28 and the radial flange 30 of the connecting sleeve 29 by means of a flanging ring 41 is shown again for clarification in FIG. 3c and is compared to the types depicted in FIGS. 3a and 3b of fastening the radial flange 28 of the sealing cap 21 to the radial flange 30 of the connecting sleeve 29 by means of reshaping.

As shown in FIG. 3a, an axial rib 42 is provided on the outer edge of the radial flange 30 of the connecting sleeve 29; this rib protrudes toward the left in the drawing beyond the radial flange 28 and by means of caulking, its material is pressed radially inward over the flange 28 on the sealing cap 21 so that a section 42' of this axial rib 42 holds this flange 28 pressed against the flange 30 of the connecting sleeve 29.

As shown in FIG. 3b, it is furthermore possible to provide an axial rib 43 on the outer circumference edge of the flange 30 of the connecting sleeve 29; the free end of this rib is pressed over the flange 28 of the sealing cap 21 in order to form a bent section 43' which in turn holds the flange 28 of the sealing cap 21 pressed against the flange 30 of the connecting sleeve 29.

The axial ribs 42, 43 depicted in FIGS. 3a and 3b can constitute closed ribs 42, 43 that run around the circumference of the flange 30. However, it is also possible instead of a closed rib 42, 43, to provide a large number of ribs 42, 43 that are distributed over the circumference and respectively extend only over a certain circumference section.

FIG. 3c shows another embodiment of the sealing cap 21, whose cup-shaped section 25, in addition to the first step 26, which forms the radial shoulder 27 for the sealing ring 35, has a second step 44 that is adjoined by a cylindrical fastening section 45 for the damper bellows 19. The damper bellows 19 is slid with a cylindrical end section 46 onto the cylindrical fastening section 45 and welded to it at the location marked 47.

The three-step embodiment of the cup section 25 makes it possible to further increase the rigidity of the sealing cap 21 in the axial direction of the damper bellows 19. Furthermore, the diameter of the cylindrical fastening section 25 can be selected independently of the sealing ring diameter according to the respectively required damper bellows 19 so that the pressure damper according to the invention can be even better adapted to the respective requirements of the pressure vessel or the fuel distributor tube and the fuel injection system.

The pressure damper 18 according to the invention, which is depicted by way of example in FIG. 2, can be manufactured as a preassembled unit by virtue of the fact that after the fastening of the damper bellows 19 to the sealing cap 21, the sealing ring 35 is slid onto its cup-shaped region and is brought into contact with the shoulder 27. The sealing cap 21 is then inserted into the connecting sleeve 29 and slid in until its flange 28 rests against the flange 30 of the connecting sleeve 29. In so doing, the sealing ring 35 is enclosed between the shoulders 27 and 34.

As a result, the sealing ring 35 is installed with play in the axial direction and seals in the radial direction by way of the opposing circumference faces on the sealing cap 21 and the connecting sleeve 29. The shoulders 27 and 34 thus only prevent the sealing ring 35 from slipping away axially. This has the advantage that axial length tolerances are non-critical.

Finally, the two flanges 28, 30 that are resting against each other are then connected to each other by means of reshaping, wherein either the flanging ring 41 depicted in FIG. 2 is used or the axial ribs 42, 43 on the radial flange 30 of the connecting sleeve 29 shown in FIG. 3a or 3b are used.

Consequently, the pressure damper 18 is completed as a preassembled unit so that its damper bellows 19 is disposed in the fastening sleeve 33 so that it is protected from damage.

In lieu of the axial ribs 42, 43 on the radial flange 30 of the connecting sleeve 29 that are shown in FIGS. 3a and 3b, it is also possible to provide corresponding ribs on the radial flange 28 of the sealing cap 21, which would then extend in the opposite direction beyond the flange 30 on the connecting sleeve 29.

In lieu of the preferred indestructible, non-detachable fastening of the sealing cap 21 to the connecting sleeve 29, for example, the flanging ring 41 can be replaced by a fastening clamp so that the sealing cap 21 can be secured to the connecting sleeve 29 in an indestructible, detachable manner.

Although it is preferable to embody the pressure damper 18 with a connecting sleeve 29 that protects the damper bellows 19 during storage, transport, and assembly, the damper bellows 19 can also be inserted with the sealing cap 21 directly into the fuel distributor tube 15 or a correspondingly adapted fitting on a pressure vessel, not shown, which must then have a radial flange that corresponds to the radial flange 30 of the connecting sleeve 29 for fastening purposes.

The foregoing relates to preferred exemplary embodiments of the invention, it being understood that other variants and embodiments thereof are possible within the spirit and scope of the invention, the latter being defined by the appended claims.

I claim:

1. A pressure damper unit which mounts on and closes an opening in a pressure vessel in a fuel distributor tube of an internal combustion engine, which unit consists of:
    a damper bellows (19) affixed to a sealing cap (21), the sealing cap (21) being of one piece and having a cup section (25) which, along with the damper bellows (19), is inserted into an elongated sleeve section (29), which sealing cap (21) has a first radial flange (28), which adjoins an edge of the cup section (25) remote from the bottom (20) of the cap, which radial flange (28) is used for fastening the sealing cap (21) to one end of the sleeve section (29), and in which the sleeve section (29) has sufficient length to completely surround the damper bellows (19), and at its opposite end has means for connecting it to the opening of the pressure vessel and closes it.

2. A pressure damper for a pressure vessel for a fuel distributor tube of an internal combustion engine, which comprises a damper bellows (19) affixed to a sealing cap (21), which closes an end opening of the pressure vessel (15), the sealing cap (21) being of one piece and having a cup section (25) which is inserted into a sleeve section (29), which sealing cap (21) has a first radial flange (28), which adjoins an edge of the cup section (25) remote from the bottom (20) of the cap, which radial flange (28) is used for fastening the sealing cap (21) to the sleeve section (29), and in which the sleeve section (29) is constituted by a connecting sleeve that is affixed to the pressure vessel (15) so that the sleeve section encompasses the opening of the pressure vessel that is to be closed.

3. A pressure damper for a pressure vessel for a fuel distributor tube of an internal combustion engine, which comprises a damper bellows (19) affixed to a one piece metal sealing cap (21) having a substantially constant wall thickness (21), which metal sealing cap is formed as a deep-drawn sheet metal part, and which closes an end opening of the pressure vessel (15), wherein the sealing cap (21) has a radial shoulder (27) which, together with an opposing shoulder (34) embodied on a sleeve section (29) associated with the opening to be closed, forms a chamber for containing a sealing ring (35).

4. The pressure damper according to claim 2, in which the sealing cap (21) is a deep-drawn metal part.

5. The pressure damper according to claim 3, in which the sealing cap (21) has a cup section (25) with which it is inserted into a sleeve section (29) associated with the opening to be closed, and has a first radial flange (28), which adjoins an edge of the cup section (25) remote from a bottom (20) and is used for fastening the sealing cap (21) to the sleeve section (29).

6. The pressure damper according to claim 2, in which the sealing cap (21) rests with the first radial flange (28) against a corresponding radial flange (30) and that the first and second radial flanges (28, 30) are fastened to each other by means of reshaping.

7. The pressure damper according to claim 6, in which the first and second radial flanges (28, 30) are axially secured to each other with a flanging ring (41).

8. The pressure damper according to claim 6, in which inside an axial rib (42, 43), the first radial flange (28) rests against an outer circumference of the second radial flange (30) and that a section (42', 43') of the axial rib (42, 43) is pressed radially inward over the first radial flange (28), by means of flanging or caulking.

9. The pressure damper according to claim 2, in which the sealing cap (21) has a radial shoulder (27) which, together with an opposing shoulder (34) embodied on a sleeve section (29) associated with the opening to be closed, forms a chamber for containing a sealing ring (35).

10. The pressure damper according to claim 6, in which the sealing cap (21) has a radial shoulder (27) which, together with an opposing shoulder (34) embodied on a sleeve section (29) associated with the opening to be closed, forms a chamber for containing a sealing ring (35).

11. The pressure damper according to claim 3, in which the shoulder (27) is provided on a cup section (25) that can be inserted into the sleeve section (29).

12. The pressure damper according to claim 7, in which the sealing cap (21) has a radial shoulder (27) which, together with an opposing shoulder (34) embodied on a sleeve section (29) associated with the opening to be closed, forms a chamber for containing a sealing ring (35).

13. The pressure damper according to claim 8, in which the sealing cap (21) has a radial shoulder (27) which, together with an opposing shoulder (34) embodied on a sleeve section (29) associated with the opening to be closed, forms a chamber for containing a sealing ring (35).

14. The pressure damper according to claim 3, in which the sleeve section is constituted by a connecting sleeve (29) that is affixed to the pressure vessel (15) so that the sleeve section encompasses the opening of this vessel that is to be closed.

15. The pressure damper according to claim 9, in which the sleeve section is constituted by a connecting sleeve (29)

that is affixed to the pressure vessel (15) so that the sleeve section encompasses the opening of this vessel that is to be closed.

16. The pressure damper according to claim 10, in which the sleeve section is constituted by a connecting sleeve (29) that is affixed to the pressure vessel (15) so that the sleeve section encompasses the opening of this vessel that is to be closed.

17. The pressure damper according to claim 2, in which the damper bellows (19) is disposed completely inside the connecting sleeve (29).

18. The pressure damper according to claim 3, in which the damper bellows (19) is connected to the sealing cap (21) whose bottom (20) is used as a sealing part of the damper bellows (19).

19. The pressure damper according to claim 3, in which the damper bellows (19) is a metal bellows.

20. The pressure damper according to claim 3, in which the damper bellows (19) is welded to the sealing cap (21).

21. The pressure damper according to claim 3, in which the damper bellows (19) is a metal bellows that is closed on the end remote from the sealing cap (21).

* * * * *